May 15, 1951  S. R. REIMEL  2,553,473

BELT-ALIGNING APPARATUS

Filed June 1, 1949

Inventor
Samuel R. Reimel

UNITED STATES PATENT OFFICE 2,553,473

BELT-ALIGNING APPARATUS

Samuel R. Reimel, Akron, Ohio, assignor to The B. F. Goodrich Company, New York, N. Y., a corporation of New York Application June 1, 1949, Serial No. 96,427

3 Claims. (Cl. 74—241)

1

This invention relates to apparatus for aligning belting, and is especially useful in aligning the belt material during manufacture of the belt and in aligning belts during operation although the invention is also useful in guiding sheet material other than belting.

In the manufacture of flat conveyor and transmission belts, plies of fabric or cords and sheet rubber material are assembled progressively about pulleys held in spaced-apart relation, the materials with the exception of the first ply, being fed progressively to the base ply as the base ply is driven about the pulleys. It has been found desirable to keep the belt running in proper alignment as otherwise shifting of the belt necessitates the use of plies wider than the desired width of the belt and requires excessive trimming with loss of material. As the belt is relatively light in weight during the early stages of assembly thereof and hence does not bear heavily upon its supports, guiding apparatus depending upon the weight of the belt to provide sufficient traction has been found unsatisfactory for guiding the belt during manufacture.

Similar problems have occurred in the running of conveyor belts of light weight construction and with light weight transmission belts, especially where the belts are relatively wide and crowned pulleys are not employed, as in such installations the belts tend to shift or creep requiring guiding means to hold them in a desired course.

It is an object of the present invention to provide for improved guiding of the traveling sheet material or belting.

Further objects are to provide adequate traction of the guiding apparatus, and to provide simplicity of mechanism and efficiency of performance.

These and other objects will appear from the following description and the accompanying drawings.

Figure 1:
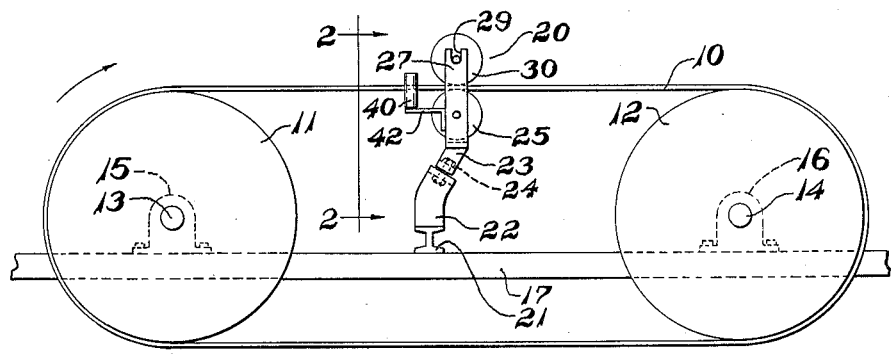
Fig. 1 is a side elevation of a belt drive and an aligning apparatus constructed in accordance with and embodying the invention.
Figure 2:
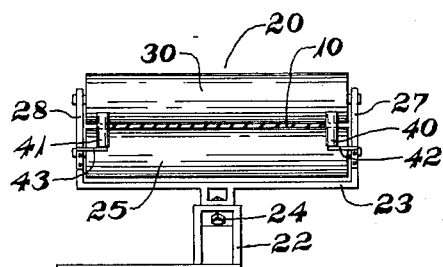
Fig. 2 is a cross-sectional view thereof taken on line 2—2 of Fig. 1.
Figure 3:
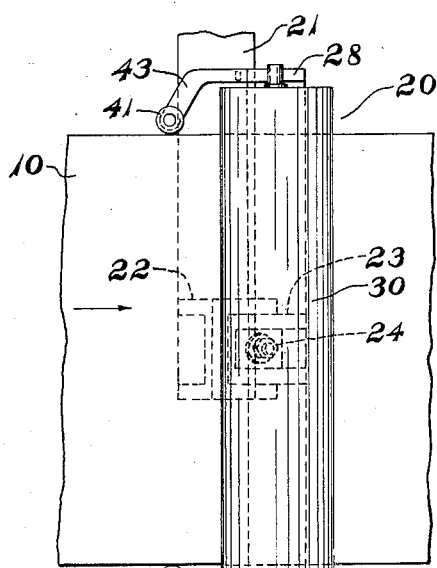
Fig. 3 is a plan view of the belt aligning apparatus and a portion of the belt engaged thereby.
Figure 4:
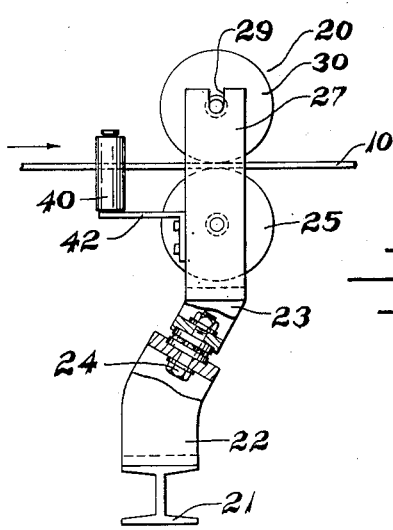
Fig. 4 is a side view thereof.

Referring to the drawings, the numeral 10 designates a belt supported by spaced apart pulleys 11, 12 between which the belt travels in upper and lower free reaches, one of the pulleys being driven by means, such as a motor (not shown). The pulleys are fixed to shafts 13, 14 respectively, which are mounted for rotation in bearings 15, 16, the bearings being supported in any desired manner, as by a frame 17.

The belt aligning apparatus 20 is mounted on the frame 17 between the pulleys 11, 12 to engage the upper reach of the belt 10. A cross-frame member 21 of the frame 17 has a bracket 22. A bifurcated yoke 23 is pivotally mounted, as at 24 on the bracket 22, the pivot having its axis in the medial longitudinal plane of the belt 10 and preferably being inclined to the upper reach of the belt 10 with its axis defining an acute angle with the approaching reach of the belt and an obtuse angle with the departing reach thereof.

Mounted for free rotation between the limbs of the yoke 23 is a roller 25. With the yoke extending normal to the belt, as in the drawings, the roller 25 is tangent to the upper reach of the belt and its axis is offset longitudinally of the belt from the pivot 24 in the direction of travel of the belt reach so as to provide caster action of the roller.

For providing greater traction of the roller 25 relative to the belt 10, the limbs 27, 28 of the yoke 23 are slotted vertically, as at 29 to retain the ends of a pressure roller 30 in vertical alignment with the roller 25, the roller having reduced ends for rotatively engaging in the slots while its pressing surface rests upon the reach of the belt.

For additionally controlling pivotal movement of the yoke, vertical guide rollers 40, 41 are mounted respectively on arms 42, 43 secured to the limbs of the yoke, their axes being perpendicular to the plane of the belt. The rollers are free to rotate and are located one at each edge of the belt. The arrangement is such that shifting of the belt will contact the belt with a guide roller, thereby swinging the yoke about its inclined pivot. Thereby the rollers 25, 30 are moved to a position askew of the belt and at the same time, due to the inclined axis of the pivot the opposite end of the roller 25 from the guide rolls contacted by the belt is raised slightly.

The inclined position of the roller 25 and its position askew of the belt both act to provide a resultant force urging the belt toward its normal position due to the roller 25 rotating at an angle to the line of travel of the belt.

As the belt returns to normal position the roll 25 is also returned due to the belt urging the opposite guide roller laterally.

The weight of the roller 30 increases friction between roller 25 and the belt, making possible the guiding of single ply or other thin material, and also prevents thin material from wrinkling while the rolls 25, 30 by being located close to the guide rollers 40, 41 and holding the material of the belt flat, tend to stiffen the edges of the belt to permit guiding by the edges.

Variations may be made without departing from the scope of the invention as it is defined by the following claims:

I claim:

1. Apparatus for aligning a running course of sheet material, said apparatus comprising an aligning roller engaging the lower face of the sheet material, means below the sheet material pivotally supporting said aligning roller at a position intermediate the edges of the sheet material, a pair of guide rollers mounted on said pivotal support for engaging opposite edges of the sheet material to swing said aligning roller about its pivotal mounting, and a second roller engaging the face of the sheet material opposite said aligning roller and pivotally movable with said aligning roller said rollers being mounted on said pivotal support with their axes in a plane acute to the axis of said support.

2. Apparatus for aligning a running belt, said apparatus comprising an aligning roller engaging the lower face of a reach of the belt, means below said reach pivotally supporting said aligning roller at a position medial of the belt, a pair of guide rollers mounted on said pivotal support for engaging opposite edges of the belt to swing said aligning roller about its pivotal mounting, said means for pivotally supporting the roller comprising a pivot bearing having its axis in a plane vertical to the face of the belt and including the median line of travel of the belt, and said axis being at an angle acute to the approaching portion of the belt, and a second roller engaging the face of the belt opposite said aligning roller and pivotally movable with said aligning roller said rollers being mounted on said pivotal support with their axes in a plane acute to the axis of said support, and said second roller being of sufficient weight to press said belt against the face of said aligning roller.

3. Apparatus for aligning a running belt, said apparatus comprising an aligning roller engaging the lower face of a reach of the belt, means below the belt pivotally supporting said aligning roller at a position medial of the belt, a pair of guide rollers mounted on said pivotal support for engaging opposite edges of the belt to swing said aligning roller about its pivotal mounting, said aligning roller being mounted with its axis longitudinally beyond the position of its pivotal support in the direction of travel of the belt, said means for pivotally supporting the roller comprising a pivot bearing having its axis in a plane vertical to the face of the belt and including the median line of travel of the belt, and said axis being at an angle acute to the approaching portion of the belt.

SAMUEL R. REIMEL.

REFERENCES CITED

The following references are of record in the file of this patent:

UNITED STATES PATENTS

| Number | Name | Date |
|---|---|---|
| 106,179 | Leavitt | Aug. 9, 1870 |
| 745,691 | Thompson | Dec. 1, 1903 |
| 752,202 | Chritton | Feb. 16, 1904 |